UNITED STATES PATENT OFFICE.

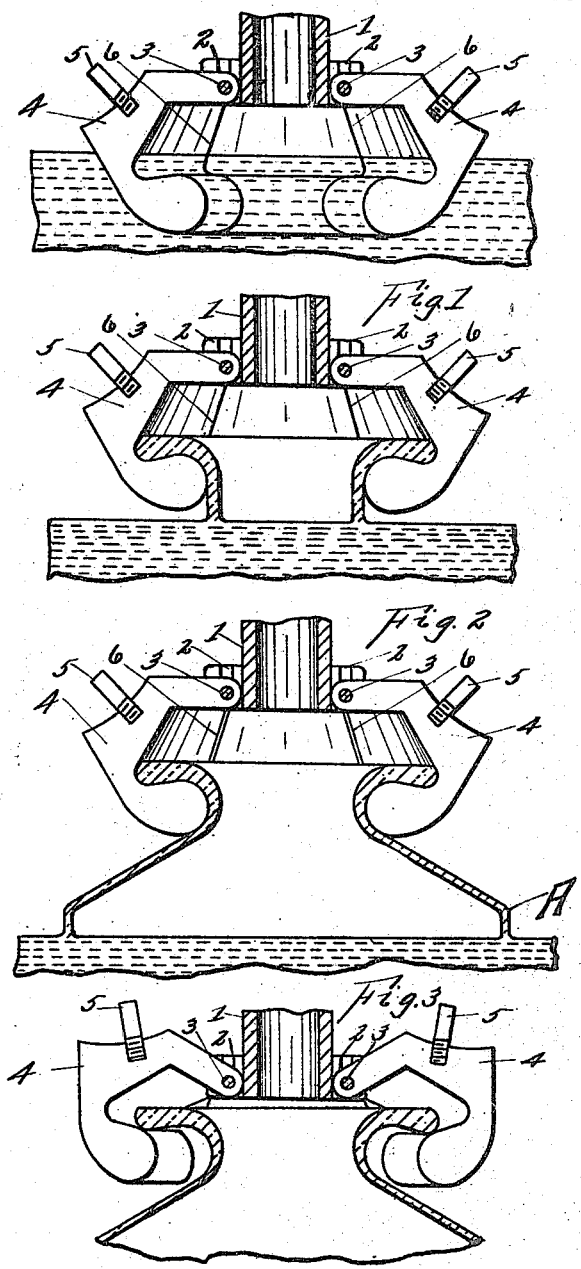

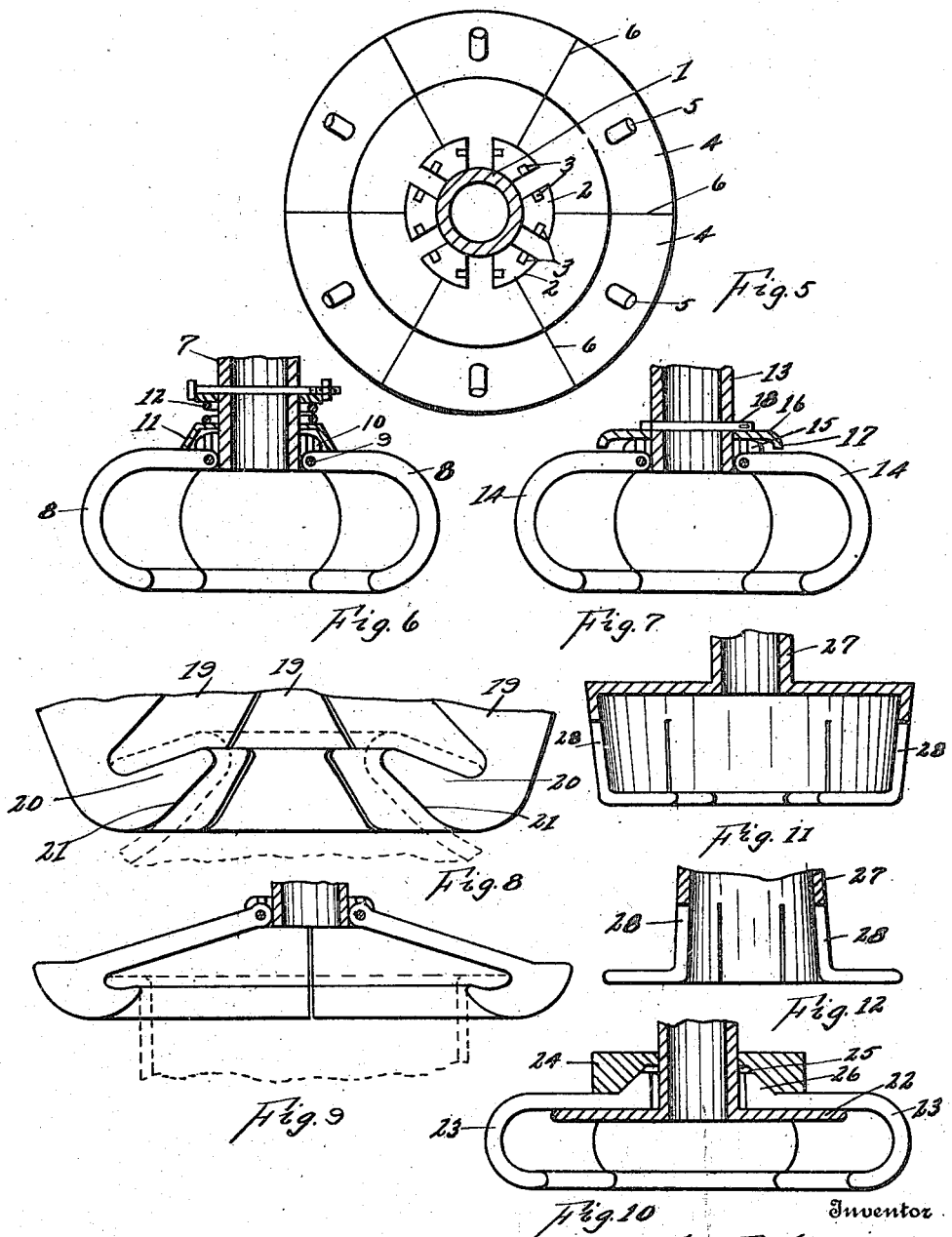

ARTHUR E. SPINASSE, OF MOUNT VERNON, OHIO.

BAIT FOR GLASS-DRAWING MACHINES.

1,170,464. Specification of Letters Patent. Patented Feb. 1, 1916.

Application filed February 10, 1913. Serial No. 747,581.

*To all whom it may concern:*

Be it known that I, ARTHUR E. SPINASSE, a citizen of the United States of America, and residing at Mount Vernon, in the county of Knox and State of Ohio, have invented certain new and useful Improvements in Baits for Glass-Drawing Machines, of which the following is a specification.

My invention relates to the art of drawing glass and has particular relation to the machinery utilized in the drawing, being an improvement in baits for glass drawing machines.

One of the principal drawbacks in the drawing of glass by machinery has, hitherto, resided in the danger of breakage which, I may state, has been largely due to the different co-efficients of the glass and the material of the bait.

My invention consists in a bait formed to be so operative as to eliminate this danger of breakage.

My invention may be best described in relation to the drawing of glass cylinders or "rollers", although it is not necessarily limited thereto.

Before entering into a description of the structural details of my bait, it seems practically necessary to outline the difficult situation to be met with in the drawing of glass with a bait.

It must first be clearly realized that, from the moment the draw commences, there will be either a band of glass surrounding a piece of the bait material which is usually iron; or there must be a band of iron surrounding a piece of glass. Now, with this condition necessarily existing, it must be very apparent that the application of even a uniform heat to the connected pieces of bait and glass would change their bulks; and the change in one would not correspond to the change in the other for the very apparent reason that their co-efficients differ. If the material of the bait were such that its co-efficient was equal to the co-efficient of that of glass, then, under a uniform heat, the expansions and contractions would doubtless accord. But, this is with a uniformly applied heat and furthermore any material whose coefficient approaches that of glass would in all probability be too expensive.

Now, let us consider and first appreciate that the heating action is not uniform and can hardly be made so. The bait is always of a different temperature from the molten glass bath into which it is inserted. This molten glass bath is generally at an approximate temperature of 1500 degrees F. Hitherto, the temperature of the bait has always been less. Consequently, there is an interchange of heat between the glass and the bait during the draw, that portion of the cylinder which connects it to the bait and which is usually termed the novel yielding up its heat to the bait. This glass novel, in giving up its heat to the bait, contracts. The bait, on the contrary, expands as it absorbs the heat until the temperatures of the glass novel and the bait are substantially equal. Probably the novel sets after the bait has expanded considerably. Then, probably, both the novel and the bait commence to cool but one inevitably cools more rapidly than the other. This would result alone from the fact that one or the other, the novel or the bait, is directly subject to the atmosphere. Furthermore, it will be apparent that neither the novel nor the bait will be individually heated with uniformity. In the first place, the edges of the bait must inevitably heat more than the rest of the body. Then, the first part of the bait to enter and the last to leave the bath must absorb more heat than the rest of the bait. Then too, it is ordinarily true that the edges of the bait are the first part to enter and the last part to leave the bath. Now, the difficulty generally arises after the comparatively brittle glass has set. For instance, assume that the novel has attained its final form during the expansion of the bait. If the glass surrounds the bait, further expansion of such bait must break the novel; or, if the bait surrounds the glass, the return of such bait to initial size on cooling must rupture the fragile glass because the novel has attained its final form during expansion and while the bait was larger than normal. This is an exposition of the difficulties which are presented due to the variations of general contour of the bait and novel in relation to each other. It must be borne in mind that these variations may seem minute to the human eye and yet may be very vital. It would be possible to enlarge upon this paragraph with little difficulty but it is thought inadvisable.

Local variations of the bait and novel surfaces may, under some conditions, be just as vitally important as variations of general contour. In this, I have particular reference to superficial variations which will cause breakage upon the setting of the novel if the novel and bait have become fused to each other. The reason for this is very simple and very apparent. Superimposed square inches of novel and bait surfaces, coinciding throughout at one temperature and instant, would not coincide the instant afterward upon the slightest temperature variation. Also, as pointed out, the temperature variations are never uniform. Now, if these superimposed square inches of surface are fused, the tension stresses arising in the effort to tear apart will break the novel, impair the bait, or do both.

To the best of my knowledge, the above analysis of the difficulties to be met with is original with me and is the result of many years of study and experiment. The basis of my invention is a recognition that the minute variations of form of the novel and bait, relatively, are material. Then, with this recognition as a basis, my invention resides in attaining novel and bait of such relative form that the effect of the variations is nullified thus rendering them immaterial.

My invention has to do with the relation of the novel to the bait from a standpoint of support and it has to do with the relation of the novel to the bait from a standpoint of form. Viewed from both standpoints, my invention has to do with the production on the bait of a novel supported in what may be termed an easy relation.

The term easy relation has a broad meaning in my mind and such easy relation has to be produced by the avoidance, primarily, of certain dangerous conditions existing between the bait and novel. The things to be avoided are: Fusion of bait and novel surfaces. Direct rupturing pressures due to relative form. Combination of direct pressures and tension stresses. Fusion of the bait and novel surfaces must be avoided. This is best effected by using the bait comparatively cold, that is, in the neighborhood of 200 degrees F. It is not improbable that the same result might be attained by covering the bait with a graphite or some similar material.

Direct rupturing pressure due to relative form must be avoided. Herein lies my invention. My invention is a bait of such structure that, given avoidance of material fusion, it will support the novel without fusion and will automatically accommodate itself to the changes in form of the novel. (In the use of the term novel I mean to include that portion of the cylinder which connects it to the bait and which may have infinite variety of form.) My invention, therefore, is a bait constructed to support the cylinder by its initial portion or novel without fusion. This bait is yieldable to avoid direct rupturing pressures and in such yielding it still holds this initial portion or novel with ample firmness to permit of blowing and drawing the cylinder. Preferably, my bait automatically returns to normal position for successive operations.

My invention may take various forms but it preferably comprises a supporting surface made up of concentrically mounted sections which may be maintained in proper position by gravity return after yielding, by inherent resiliency, or by supplemental springs or weights. The sections are sufficiently close together to prevent the glass from readily flowing therebetween and they contract and expand individually, spreading and contracting in assemblage when necessary to avoid rupture of the novel. The relation between the novel and the bait is essentially that of the coupling—in its broad features a car coupling—in which the coupling member of the novel or cylinder is formed by the chilling effect of the bait coupling member.

The preferred embodiments of my invention are shown in the accompanying drawings in which similar characters of reference designate corresponding parts and in which:

Figure 1 is a section taken through one form of my improved bait and showing it in the act of dipping into the molten bath just prior to drawing. Fig. 2 is a section taken through the same bait immediately after the drawing operation has commenced, the core of the novel remaining on the surface of the bath. Fig. 3 is a section showing the bait at a slightly subsequent period of the drawing operation and after the blowing action has commenced. It will be noted that the assembled sections have slightly separated in response to conflicting pressures between the bait and novel. It will also be noted that the neck customary in forming cylinders has been done away with in this showing. This would be impossible in a non-yielding bait. Fig. 4 is a section of the same bait showing its manner of removal from the novel when the drawing operation has been completed. Fig. 5 is a top plan view of the bait shown in the preceding figures of the drawing, showing the air pipe in section. Fig. 6 is a section of a modified form of bait wherein the sections are resiliently maintained in operative position by a washer under the control of a coil spring. Fig. 7 is a section of a bait having hinged sections which are under the control of a washer to the extent that such washer precluded excessive spreading while the mounting of the sections gives them a natural tendency to return to operative position. Fig. 8 is a section of another yielding bait which embodies the principles of my invention and which is particularly adapted to the drawing and blowing of a cylinder without a neck, resulting in a very material saving of time. Fig. 9 is a section through a still different form of bait constructed in accordance with my invention. Fig. 10 is another modification of my sectional bait wherein the sections are laterally yieldable with a sliding action. Fig. 11 shows a form of yielding bait wherein the sections are inherently resilient and form a pocket for retaining and supporting the novel. Fig. 12 shows a bait substantially similar to that shown in Fig. 11, with the exception that the novel is to be supported upon the exterior of the bait instead of within a pocket formed by the sections.

In the drawings, Figs. 1 to 5, inclusive, show the bait as comprising a pipe 1 with socketed ears 2 for the support of pins 3 of gravity sections 4. These sections are mounted to have a common center and are of a form to produce a pocket for the retention and support of a novel, inasmuch as they have supporting surfaces which are substantially horizontal but for the fact that they are slightly dished at the rear to form shallow grooves with inwardly and upwardly inclined walls. Also, the orificial walls of the sections are desirably rounded or given a gradually outward sweep, while the adjacent exterior surfaces of the sections are formed to shed the glass with which they come in contact. Each section may be provided with a handle 5. The sections are so hingedly supported that they naturally assume such relative positions as to form a pocket with slightly concaved novel supporting surfaces and with the remaining surfaces free of restraining abutments or projections. The operation of this form is probably best made clear by reference to Figs. 1, 2, 3 and 4, successively. Fig. 1 shows the bait in the normal position of its parts. Inasmuch as I preferably use the bait while at an approximate temperature of 200 degrees F., or less the exchange of heat between the glass and the bait has already begun. Fig. 2 shows the bait immediately after the drawing operation has commenced, at which time the position of the bait sections in relation to each other has not noticeably changed. Fig. 3 shows the bait after the drawing has progressed somewhat, it being noted that the sections have separated in yielding to avoid rupturing the novel. The comparative sizes of the slots 6 is indicative of what has taken place, and, although the change of position is apparently slight, it is just sufficient to avoid the rupturing pressure which would otherwise have arisen. Fig. 4 shows the manner of removing the novel from the bait. It will be apparent that this is effected by separating the sections and that it therefore becomes unnecessary to break the novel. That this is a distinct advantage, will be appreciated by workers in the art who have observed that the breaking of the novel on the bait frequently causes impairment of such bait.

The form of bait shown in Fig. 6 comprises a pipe 7, sections 8 hinged as at 9 to ears 10 and a means for resisting and finally limiting the outward swinging of these sections upon their hinges or pivots. This means is in the form of an inverted cup-shaped washer 11 which surrounds the pipe 7 and is normally forced downward by a coil spring 12.

Fig. 7 shows a bait comprising a pipe 13 and sections 14 hinged to ears 15. Superposed above the sections and exercising an ultimate restraint upon their yielding movement is a washer 16 having its edge downwardly turned as at 17 and terminating just above the sections and at such a distance therefrom as to give them some slight capability of yielding and yet prevent too great a spreading. This washer may be held in place by a pin 18 which extends through the pipe 13 immediately thereover.

Fig. 8 is illustrative of a feature which, aside from the obviation of breakage, is probably the most vital result of my improvement, that is the ability to draw the cylinder without the initial forming of a neck and permitting it to set. In actual practice, this forming of the neck and permitting it to set has hitherto occupied a very material part of the complete drawing period. With my yielding bait this neck, which was necessarily formed in all non-yielding baits, need not be formed. With the solid bait the neck must be permitted to set before blowing. This was the case with the hot bait and it is equally true of the cold pocket bait of solid form. In the pocket bait of solid form, failure to allow the neck to set before blowing would result in the formation of the novel too close to the bait at its point of departure therefrom. This would occur while the bait was expanded and return of the bait to normal position would break the novel. Now, in this figure, it will be seen that the sections 19 are in the form of hooks terminating in upwardly and inwardly directed wedges 20 whose lower surfaces 21 have a gradually downward and outward trend. Immediately after the novel is secured, its depending portion may be blown outwardly into contact with the surfaces 21. It is not necessary or advisable to await forming and setting of any neck.

Fig. 9 shows a still further possibility of my invention which arises from the ability to do away with both the neck and the cap which have always, hitherto, been formed preliminary to the actual forming of the cylinder. (This cap which is eliminated is well exemplified at A in Fig. 3). It will be seen that there remains only the novel to connect the cylinder to the bait and that the diameter of the cylinder is substantially equal to the inner diameter of the bait. This bait is also of unusual advantage because of the increased area of the surfaces which come in contact with the glass bath and which serve to more effectually chill the glass. However, the sections may vary as to form.

Fig. 10 represents a bait in which the pipe carries a disk-like flange 22 on its lower end, the upper surface of such flange supporting sections 23 of hook-like form and producing a pocket structure when assembled. These sections are freely slidable upon the flange 22 except for the restraint of a weighty washer 24 having a conical socket 25 which embraces and rests upon wedge-like formations 26 upon the inner ends of the sections. It will be apparent that this weighty washer tends to maintain the sections in their normally indrawn positions but that they may spread under radially outward pressure. In operation, this is just what happens and the danger of direct rupturing pressure is obviated.

Figs. 11 and 12 show forms of yielding baits whose yielding action is attained through the inherent resiliency of fingers which correspond to the sections in the other forms described. In both forms, the pipe 27 carries an integral formation comprising resilient fingers 28 and the action will be apparent.

In summary, my invention consists in the provision of an improved form of bait which is such that direct rupturing pressures are avoided for the reason that, since the novel will not yield after it has once set, the bait automatically yields and varies its form to sufficiently avoid all conflicts which threaten to rupture either the bait or novel.

I do not limit myself to the forms of baits shown, since a malleable metal bait might serve. However, the scope of my invention is set forth in the appended claims.

Having thus described my invention, what I claim as new and desire to cover by Letters Patent, is:

1. A bait for drawing glass comprising a continuous element constructed to vary its form in avoidance of relatively rupturing pressures, said element being so constructed that the novel may be supported without fusion and may be so formed in relation to said element that it will not interfere with the said variation of form.

2. A bait for drawing glass comprising a continuous element having yieldable sections, said element being so constructed that the novel may be supported without fusion and may be so formed in relation thereto that it will not interfere with the yielding of said sections.

3. A bait for drawing glass comprising a continuous novel-supporting element having sections yieldable at the point of departure of the novel from the bait, said element being so constructed that the novel may be supported without fusion and may be so formed in relation to said element that it will not interfere with the yielding of said sections.

4. A bait for drawing glass comprising a continuous novel-supporting element having sections capable of a substantially horizontal yielding action, said element being so constructed that the novel may be supported without fusion and may be so formed in relation thereto that it will not interfere with the yielding of said sections.

5. A bait for drawing glass comprising sections assembled to produce a pocket adapted to support a novel without fusion, said sections being continuous and being yieldable to render the walls of the said pocket automatically adjustable.

6. A bait for drawing glass comprising sections pivoted in assemblage at their upper ends and normally disposed to produce a surface adapted to support a novel without fusion, said sections forming a continuous bait and being capable of swinging on their pivots sufficiently to accommodate variations of the relative forms of the novel and bait.

7. A bait for drawing glass comprising sections pivoted in assemblage to form a pocket of a contour to support a novel without fusion, said sections forming a continuous bait and being capable of swinging on their pivots sufficiently to avoid rupturing pressures between the bait and the novel supported within its pocket.

8. A bait for drawing a glass cylinder comprising a continuous element constructed of yielding parts and adapted to support a novel and at the same time yield to avoid rupturing pressures, said bait having a contour to permit immediate blowing of the cylinder whereby the glass may be blown outward against said yielding parts without locking the bait against its yielding action.

9. A device for drawing glass comprising a hollow bait with inwardly extending fingers, provision being made in the bait whereby expansion or contraction of the bait and novel with reference to each other may be converted into a modification of the shape of the bait with reference to the novel, without the development of constrictive pressure upon the novel.

10. A bait for drawing glass comprising a hollow continuous element having yielding sections, said element being so constructed that when the novel is supported without fusion, expansion and contraction of said novel with reference to the bait may be taken care of without the development of rupturing strains or pressures between the novel and the bait.

11. A hollow continuous bait for drawing glass cylinders, said bait being made in yieldable sections.

12. A hollow continuous bait for drawing glass cylinders, said bait being continuous and consisting of sections pendant at the top and inwardly curved at the bottom, whereby upon expansion of a novel said sections may yield outwardly.

13. A bait for drawing glass cylinders consisting of an air pipe, a head mounted on the end of said air pipe, and bait sections pivoted on said head, said sections being inwardly curved and continuous at their bottom so as to form a bait narrower at its lower end than at its interior, whereby when a novel is formed, expanding stresses may be converted into an outward push of the novel head upon the bait, whereby the sections of said bait are made to swing outward or diverge without rupturing effect.

14. A bait for drawing glass cylinders consisting of a pipe whereby air may be introduced into the interior of said cylinders, ears secured upon the lower end of said pipe, bait sections pivoted upon said ears, and pendant from said pivots, and turned inward at their bottom so as to form a continuous edge for the bait, the line of said edge being outside or forming a larger circle than the line of pivots whereby the weight of said sections always tends to draw them together at the bottom.

In testimony whereof I hereby, affix my signature in presence of two witnesses.

ARTHUR E. SPINASSE.

Witnesses:
WALTER E. L. BOCK,
ROSCOE WRAY.